US012600569B2

(12) United States Patent
Zheng et al.

(10) Patent No.: US 12,600,569 B2
(45) Date of Patent: Apr. 14, 2026

(54) RECESSED DRAWER OPENING APPARATUS

(71) Applicant: Hexagon Metrology, Inc., North Kingstown, RI (US)

(72) Inventors: Jie Zheng, North Kingstown, RI (US); Gregory Klein, East Greenwich, RI (US); Jonathan J. O'Hare, East Greenwich, RI (US); Jonathan Dove, Woodstock, IL (US)

(73) Assignee: Hexagon Metrology, Inc., North Kingstown, RI (US)

( * ) Notice: Subject to any disclaimer, the term of this patent is extended or adjusted under 35 U.S.C. 154(b) by 1035 days.

(21) Appl. No.: 17/699,054

(22) Filed: Mar. 18, 2022

(65) Prior Publication Data

US 2023/0294918 A1　　Sep. 21, 2023

(51) Int. Cl.
B65G 1/10 (2006.01)
B25J 9/00 (2006.01)
B25J 15/00 (2006.01)

(52) U.S. Cl.
CPC ............... B65G 1/10 (2013.01); B25J 15/00 (2013.01); *B25J 9/0096* (2013.01)

(58) Field of Classification Search
CPC .................................. B65G 1/10; B25J 9/0096
See application file for complete search history.

(56) References Cited

U.S. PATENT DOCUMENTS

| | | | |
|---|---|---|---|
| 9,351,569 B1 | 5/2016 | Lucey et al. | |
| 2019/0143872 A1* | 5/2019 | Gil ........................ | B60P 1/4471 |
| | | | 211/86.01 |

FOREIGN PATENT DOCUMENTS

| | | |
|---|---|---|
| JP | H06103312 B2 | 12/1994 |
| JP | 2004231357 A | 8/2004 |
| JP | 6796901 B1 | 12/2020 |

OTHER PUBLICATIONS

International Search Report and Written Opinion for International Application No. PCT/2023/011593, mailed Oct. 13, 2023 (12 pages) [37401-17902].

* cited by examiner

*Primary Examiner* — Saul Rodriguez
(74) *Attorney, Agent, or Firm* — Nutter McClennen & Fish LLP

(57) ABSTRACT

A drawer opening system includes a hitch on a robot arm, and a block assembly disposed within a cavity on an external face of a first drawer, such that the hitch is configured to approach the external face of the drawer, enter the recess, and securely engage the block assembly within the cavity. In illustrative embodiments, when not engaged with the hitch, no part of the block assembly extends beyond the external face of the drawer such that it would impede access of a robot to a second open drawer disposed beneath the first drawer.

17 Claims, 11 Drawing Sheets

RECESSED DRAWER OPENING APPARATUS

TECHNICAL FIELD

Embodiments generally relate to robotics, more particularly, embodiments relate to robots used in an inspection process.

BACKGROUND ART

Some manufacturing processes perform operations on a workpiece using one or more industrial machines, such as machining the workpiece with a machine tool or Computer Numerical Control (CNC) machine, assembling the workpiece with a robot, and/or verifying workpiece dimensions with a coordinate measuring machine, to name but a few examples. Typically, each workpiece is stored in a workpiece storage facility before and/or after performance of such operations. Each workpiece may be retrieved from a workpiece storage facility to be delivered to an industrial machine before operation on the workpiece by the industrial machine, and may be delivered to the workpiece storage facility after operation on the workpiece by the industrial machine. Typical workpiece storage facilities, however, have shortcomings that impede retrieval of a workpiece from, and/or delivery of a workpiece to, a workpiece storage facility by a robot.

SUMMARY OF VARIOUS EMBODIMENTS

In accordance with one embodiment, a container apparatus for holding workpieces to be inspected is configured to movably mate to a storage apparatus. That container apparatus includes:

a storage apparatus interface assembly configured to movably mate the container apparatus to the storage apparatus;

a container assembly defining a workpiece storage volume; and a block assembly rigidly fixed to the container assembly and exposed to an environment external to the workpiece storage volume, the block assembly comprising a coupling block configured to removably mate with a corresponding hitch from the environment external to the workpiece storage volume.

In some embodiments, the container assembly includes a front panel, the front panel having a three-dimensional panel volume and an external surface facing way from the workpiece storage volume, and a cavity opening through the external surface of the front panel from space external to the workpiece storage volume and extending into the three-dimensional panel volume, wherein the block assembly is rigidly fixed to the container assembly within the three-dimensional panel volume.

In some embodiments, the block assembly is disposed such that the hitch can move to and removably couple with the block assembly without the hitch having to enter or pass through the workpiece storage volume.

In some embodiments, the container assembly defines a container volume, the workpiece storage volume being a portion of the container volume and enclosed within the container volume; and the block assembly is disposed within the container volume but at least partially external to the workpiece storage volume.

In some embodiments, outer dimensions of the container assembly define a footprint of the container assembly, and the block assembly does not extend from the cavity such that it exceeds the footprint of the container assembly.

In some embodiments, the block assembly further includes a flexible shock absorber operably coupled between the coupling block and a surface of the container assembly, the shock absorber configured to reduce physical shock from impact of the corresponding hitch with the block assembly, and also to isolate the container assembly from vibration arising from the hitch during container assembly movement.

In some embodiments, the coupling block has a shape of a semi-sphere. In other embodiments, the coupling block has a shape of a hemisphere. In yet other embodiments, the coupling block has a shape of a frustum of a cone.

In some embodiments, the corresponding hitch includes a beam having an aperture, the aperture having a size sufficient to fit over the coupling block to removably mate the hitch to the coupling block, but said size not sufficient to allow the coupling block to pass completely through the aperture when the hitch removably mates with the coupling block. In other embodiments, the corresponding hitch includes a beam having an aperture, the aperture having a size sufficient to allow the coupling block to pass completely through the aperture to removably mate the hitch with the coupling block.

In some embodiments, wherein the entire container assembly defines a volume and outer perimeter, wherein the volume of the container assembly fits completely within the outer perimeter, and wherein the block assembly does not define any portion of the outer perimeter.

In some embodiments, the entire container assembly defines a volume and the block assembly fits completely within the volume.

Another embodiment includes a storage apparatus. An illustrative embodiment of the storage apparatus includes:

a set of container assemblies, each container assembly of the set of container assembly movably coupled to a frame, wherein at least one container assembly of the set of container assemblies defines a workpiece storage volume and includes:

a storage apparatus interface assembly configured to movably mate the container assembly to the frame; and a block assembly rigidly fixed to the container assembly and exposed to an environment external to the workpiece storage volume, the block assembly including a coupling block configured to removably mate with a corresponding hitch from the environment external to the workpiece storage volume.

In some embodiments, the at least one the container assembly includes a front panel, the front panel having a three-dimensional panel volume and an external surface facing way from the workpiece storage volume, and a cavity opening through the external surface of the front panel from space external to the workpiece storage volume and extending into the three-dimensional panel volume.

In some embodiments, the corresponding hitch includes a beam having an aperture, the aperture having a size sufficient to fit over the coupling block to removably mate the hitch to the coupling block, but said size not sufficient to allow the coupling block to pass completely through the aperture when the hitch removably mates with the coupling block. In other embodiments, the corresponding hitch includes a beam having an aperture, the aperture having a size sufficient to allow the coupling block to pass completely through the aperture when the hitch removably mates with the coupling block.

Yet another embodiment includes a method, the method including:

providing a movable container assembly, the container assembly defining a workpiece storage volume, and the container assembly including a container assembly interface configured to movably mate the container apparatus to a storage apparatus;

a block assembly rigidly fixed to the container assembly and exposed to an environment external to the workpiece storage volume, the block assembly including a coupling block configured to removably mate with a corresponding hitch from the environment external to the workpiece storage volume;

providing a robot apparatus having a hitch configured to removably couple to the block assembly; and automatically moving the robot apparatus to removably couple the hitch to the block assembly.

Some embodiments further include moving the container assembly while the hitch is removably coupled to the block assembly by applying a force to the block assembly from the robot apparatus. In some such embodiments, moving the container assembly includes moving the container assembly in a direction away from the storage apparatus.

BRIEF DESCRIPTION OF THE DRAWINGS

Those skilled in the art should more fully appreciate advantages of various embodiments from the following "Description of Illustrative Embodiments," discussed with reference to the drawings summarized immediately below.

DESCRIPTION OF ILLUSTRATIVE EMBODIMENTS

Illustrative embodiments provide a workpiece storage container having a handle that is accessible by a robotic arm, but which does not interfere with motion of the workpiece storage container, and does not interfere with robotic access to any workpiece held by the workpiece storage container. For example, in some embodiments the handle (e.g., block assembly 430, described below) is disposed within a recess in the workpiece storage container so that the handle does not interfere with a robot picking a workpiece from the workpiece storage container.

Definitions

As used in this description and the accompanying claims, the following terms shall have the meanings indicated, unless the context otherwise requires.

A "container" (or "container assembly") is an apparatus configured to hold a set of workpieces, and to allow a robot to pick a workpiece from the set of workpieces. In some embodiments, a container may be a drawer having a three-dimensional internal volume (a "workpiece storage volume"), and in some embodiments, a container may be a plate having or defining a surface (e.g., a two-dimensional surface), said surface defining a three-dimensional workpiece storage volume above the two-dimensional surface.

A "coupling block" is an apparatus configured to removably mate with a hitch. A coupling block may have any of a variety of shapes, including a sphere, a hemisphere, a semi-sphere, and a cube, to name but a few examples. In preferred embodiments, a coupling block is a rigid body. In some embodiments, the coupling block may be an RS Pro stainless steel ball knob having a 16 mm diameter, available from Allied Electronics and Automation.

To "removably mate" (or "removably couple") when used to describe mating a coupling block and a hitch, means that the hitch may securely engage the coupling block without use of a fastener, and subsequently disengage the coupling block without cutting, without human intervention, and without damage to the coupling block or to the hitch.

A "set" includes at least one member.

Environment

Figure 1A:
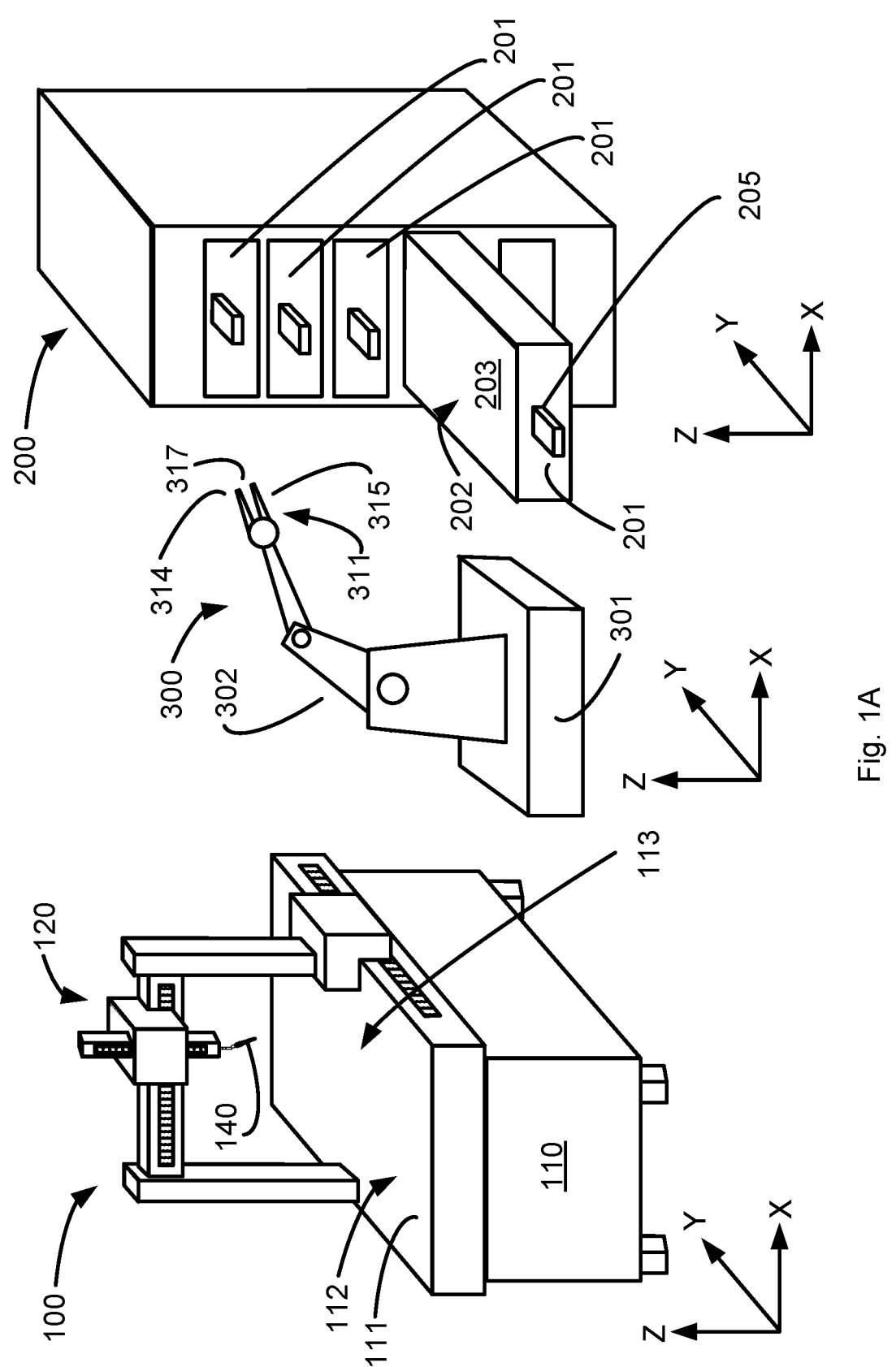
FIG. 1A schematically illustrates a coordinate measuring machine, a robot and a storage unit for storing workpieces.

FIG. 1A schematically illustrates a working environment for various embodiments. As shown the environment includes a coordinate measuring machine 100, and a storage apparatus 200, and a robot 300.

Coordinate Measuring Machine 100

As known by those in the art, a coordinate measuring machine (or "CMM") 100 is a system configured to measure one or more features of a workpiece. Coordinate measuring machines are represented in FIG. 1A by coordinate measuring machine 100.

FIGS. 1B-1E schematically illustrate a coordinate measurement machine 100 (hereinafter "CMM 100") that may be configured in accordance with illustrative embodiments.

As known by those in the art, a CMM is a system configured to measure one or more features of a workpiece 180. An illustrative embodiment of a workpiece 180 is schematically illustrated in FIG. 1C. Typically, a workpiece 180 has a specified shape with specified dimensions, which may be referred-to collectively as the "geometry" 181 of the workpiece 180. As an example, a workpiece 180 may have an edge 182, and a corner 183. A workpiece 180 may also have surfaces, such as a flat surface 184, and a curved surface 185. A meeting of two surfaces may create an inside angle 187. Moreover, each surface may have physical characteristic such as waviness 188 and/or surface finish 189, as known in the art. A workpiece 180 may also have a cavity 186, which may also be an aperture through the workpiece 180. As known in the art, a cavity 186 may have dimensions such as width and depth, which may in turn define an aspect ratio of the cavity 186.

CMM Base

In the illustrative embodiment of FIG. 1A, the CMM 100 includes a base 110 having a table 111. The table 111 of the CMM 100 defines an X-Y plane 112 that typically is parallel to the plane of the floor 101, and a Z-axis normal to the X-Y plane, and a corresponding X-Z plane and Y-Z plane. The table 111 also defines a boundary of a measuring space 113 above the table 111. In some embodiments, the CMM 100 includes a probe rack 115 configured to hold one or more measuring sensors 140. A moveable part of the CMM 100 may move to the probe rack 115 and place a measuring sensor 140 into the probe rack 115, and/or remove another measuring sensor 140 from the probe rack 115.

Moveable Parts

The CMM 100 also has movable features (collectively, 120) arranged to move and orient a measuring sensor 140 (and in some embodiments, a plurality of such devices) relative to the workpiece 180. As described below, movable features of the CMM 100 are configured to move and orient the measuring sensor 140, relative to the workpiece 180, in one dimension (X-axis; Y-axis; or Z-axis), two dimensions (X-Y plane; X-Z plane; or Y-Z plane), or three dimensions (a volume defined by the X-axis, Y-axis, and Z-axis). Accordingly, the CMM 100 is configured to measure the location of one or more features of the workpiece 180.

Figure 1B:
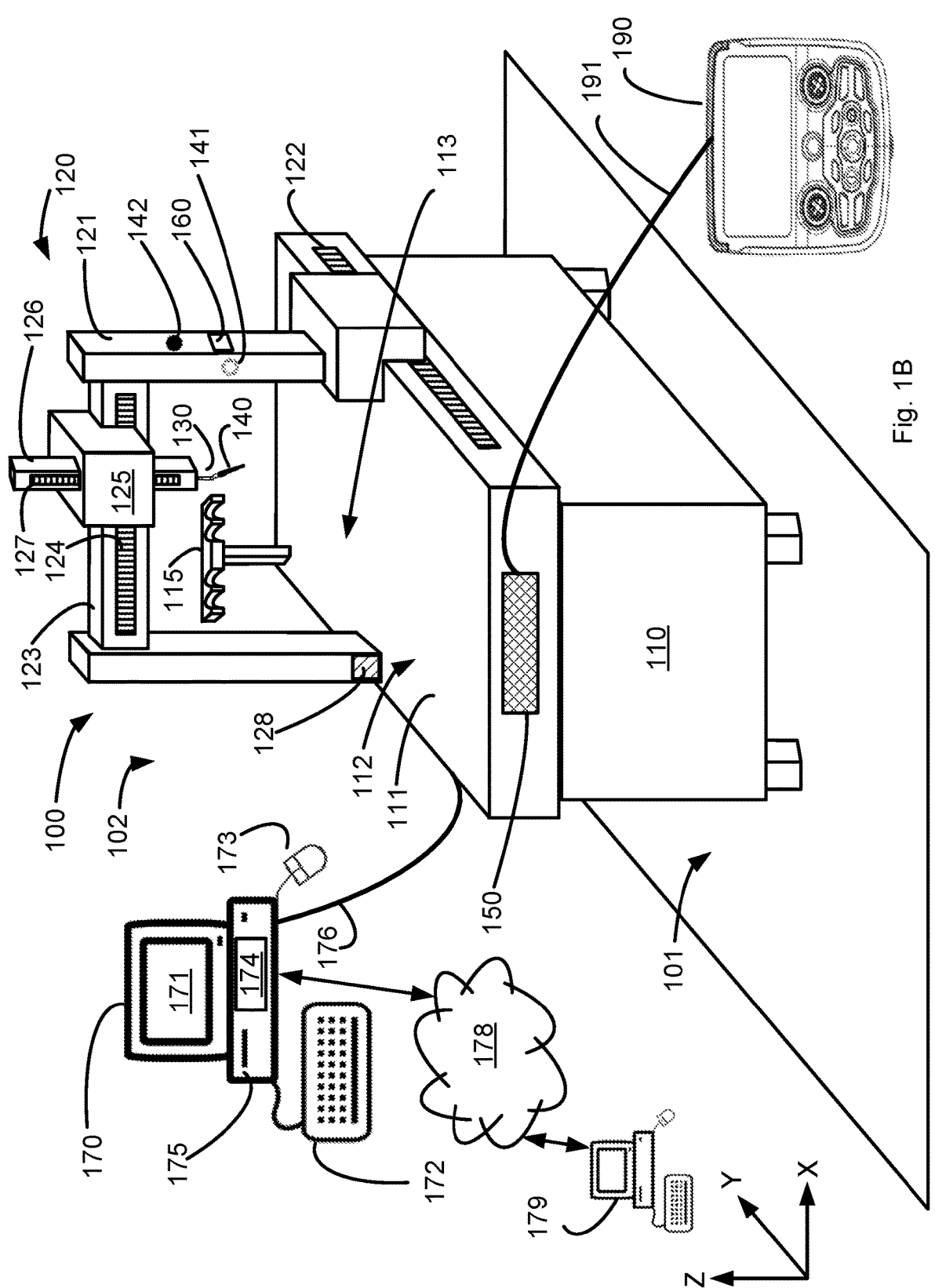
FIG. 1B schematically illustrates an embodiment of a coordinate measuring machine.
Figures 1C, 1D, 1E:
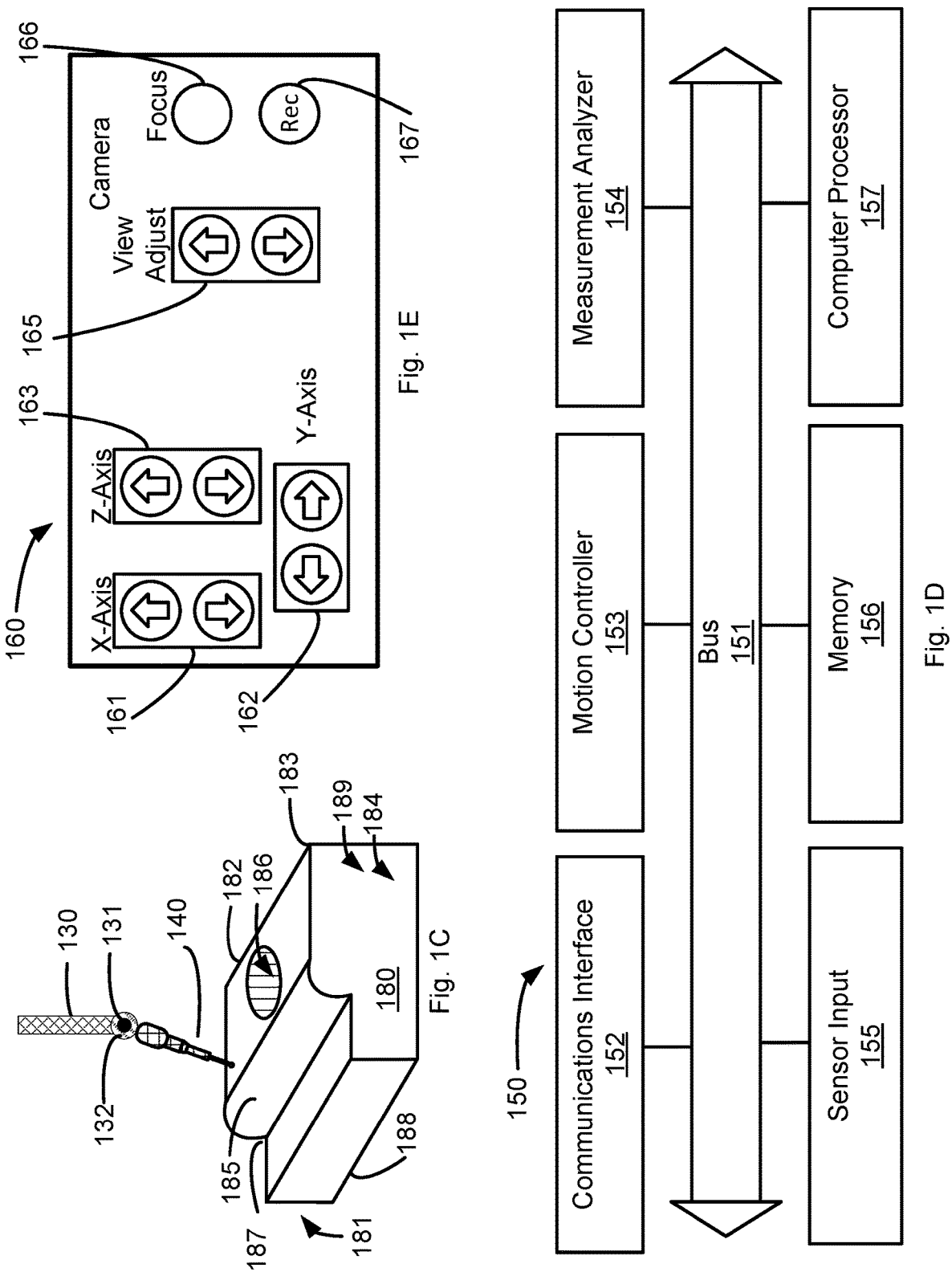
FIG. 1C schematically illustrates an embodiment of a workpiece.
FIG. 1D an embodiment of a control system for a coordinate measuring machine.
FIG. 1E schematically illustrates an embodiment of a manual user interface for a coordinate measuring machine.

The CMM 100 of FIG. 1B is known as a "bridge" CMM. Movable features 120 of the bridge CMM 100 include a bridge 123 movably coupled to the base 110 by legs 121. The bridge 123 and legs 121 are controllably movable relative to the base 110 along the R-axis.

To facilitate motion of the legs relative to the base 110, the legs 121 may be coupled to the base 110 by one or bearings 128. As known in the art, a bearing may be a roller bearing or an air bearing, to name but a few examples.

The movable features also include a carriage 125 movably coupled to the bridge 123. The carriage is configured to controllably move in the Q-axis along the bridge 123. The position of the carriage 125 along the bridge 123 may be determined by a bridge scale 124 operably coupled to the bridge 123.

A spindle 126 is moveably coupled to the carriage 125. The spindle 126 is configured to controllably move in the S-axis. The position in the S-axis of the spindle 126 may be determined by a spindle scale 127 operably coupled to the spindle 126. The measuring sensor 140 is operably coupled to the spindle 126. Consequently, the measuring sensor 140 is controllably movable in three dimensions relative to a workpiece 180 in the measuring space 113.

In some embodiments, the measuring sensor 140 is moveably coupled to the spindle 126 by an articulated arm 130. For example, the measuring sensor 140 may be movably coupled to the arm 130 by a movable joint 131. The moveable joint 131 allows the orientation of the measuring sensor 140 to be controllably adjusted relative to the arm 130, to provide to the measuring sensor 140 additional degrees of freedom in the X-axis, Y-axis, and/or Z-axis.

In other embodiments, which may be generally referred-to as "gantry" CMMs, the legs 121 stand on the floor 101, and the measuring space 113 is defined relative to the floor 101.

In yet other embodiments, the measuring sensor 140 is fixed to (i.e., not movable relative to) the base 110, and the table 111 is movable in one, two or three dimensions relative to the measuring sensor 140. In some coordinate measuring machines, the table 111 may also be rotatable in the X-Y plane. In such embodiments, the CMM 100 moves the workpiece 180 relative to the measuring sensor.

In other embodiments, which may be generally referred-to as "horizontal arm" CMMs, the bridge 123 is movably coupled to the base 110 to extend in the Z-axis, and to be controllably movable along the Y-axis. In such a CMM, the arm 130 is controllably extendable in the Z-axis, and controllably movable up and down the bridge 123 in the Z-axis.

In yet other embodiments, the arm 130 is articulated. One end of the arm 130 is fixed to the base 110, and a distal end of the arm 130 is movable relative to the base 110 in one, two or three dimensions relative to a workpiece 180 in the measuring space 113.

Sensors

In some embodiments, the measuring sensor 140 may be a tactile probe (configured to detect the location of a point on the workpiece 180 by contacting a probe tip to the workpiece 180, as known in the art), a non-contact probe (configured to detect the location of a point on the workpiece 180 without physically contacting the workpiece 180), such as a capacitive probe or an inductive probe as known in the art, or an optical probe (configured to optically detect the location of a point on the workpiece 180), to name but a few examples.

In some embodiments, the measuring sensor 140 is a vision sensor that "sees" the workpiece 180. Such a vision sensor may be a camera capable of focusing on the workpiece 180, or the measurement area 113, and configured to capture and record still images or video images. Such images, and/or pixels within such images, may be analyzed to locate the workpiece 180; determine the placement and/or orientation of the workpiece 180; identify the workpiece 180; and/or measure the workpiece 180, to name but a few examples.

Some embodiments of a CMM 100 may include one, or more than one, camera 141 configured such that the measurement envelope 113 is within the field of view of the camera 141. Such a camera 141 may be in addition to a measuring sensor 140. The camera 141 may be a digital camera configured to capture still images and/or video images of the measurement envelope 113, a workpiece 180 on the CMM 100, and/or the environment around the CMM 100. Such images may be color images, black and white images, and/or grayscale image, and the camera 141 may output such images as digital data, discrete pixels, or in analog form.

Some embodiments of a CMM 100 may also include an environmental sensor 142 configured to measure one or more characteristics of the environment 102 in which the CMM is placed, and some embodiments may have more than one such environmental sensor 142. For example, an environmental sensor 142 may be configured to measure the temperature, pressure, or chemical content of the environment 102 around the CMM 100. An environmental sensor 142 may also be a motion sensor, such as an accelerometer or a gyroscope, configured to measure vibrations of the CMM caused, for example, the by motion of people or objects near the CMM 100. An environmental sensor 142 may also be a light detector configured to measure ambient light in the environment 102, which ambient light might, for example, interfere with the operation of an optical sensor or vision sensor. In yet another embodiment, an environmental sensor 142 may be sound sensor, such as a microphone, configured to detect sound energy in the environment.

In operation, the CMM 100 measures the workpiece 180 by moving the measuring sensor 140 relative to the workpiece 180 to measure the workpiece 180.

CMM Control System

Some embodiments of a CMM 100 include a control system 150 (or "controller" or "control logic") configured to control the CMM 100, and process data acquired by the CMM. FIG. 1D schematically illustrates an embodiment of a control system 150 having several modules in electronic communication over a bus 151.

In general, some or all of the modules may be implemented in one or more integrated circuits, such as an ASIC, a gate array, a microcontroller, or a custom circuit, and at least some of the modules may be implemented in non-transient computer-implemented code capable of being executed on a computer processor 157.

Some embodiments include a computer processor 157, which may be a microprocessor as available from Intel Corporation, or an implementation of a processor core, such as an ARM core, to name but a few examples. The computer processor 157 may have on-board, non-transient digital memory (e.g., RAM or ROM) for storing data and/or computer code, including non-transient instructions for implementing some or all of the control system operations and methods. Alternately, or in addition, the computer processor 157 may be operably coupled to other non-transient digital memory, such as RAM or ROM, or a programmable non-transient memory circuit for storing such computer code and/or control data. Consequently, some or all of the functions of the controller 150 may be implemented in software configured to execute on the computer processor.

The control system 150 includes a communications interface 152 configured to communicate with other parts of the CMM 100, or with external devices, such as computer 170 via communications link 176. To that end, communications interface 152 may include various communications interfaces, such as an Ethernet connection, a USB port, or a Firewire port, to name but a few examples.

The control system 150 also includes a sensor input 155 operably coupled to one or more sensors, such as a measuring sensor 140 or camera 141. The sensor input 155 is configured to receive electronic signals from sensors, and in some embodiments to digitize such signals, using a digital to analog ("D/A") converter. The sensor input 155 is coupled to other modules of the control system 150 to provide to such other modules the (digitized) signals received from sensors.

The motion controller 153 is configured to cause motion of one or more of the movable features of the CMM 100. For example, under control of the computer processor 157, the motion controller 153 may send electrical control signals to one or more motors within the CMM 100 to cause movable features of the CMM 100 to move a measuring sensor 140 to various points within the measuring space 113 and take measurements of the workpiece 180 at such points. The motion controller 153 may control such motion in response to a measurement program stored in memory module 156, or stored in computer 170, or in response to manual control by an operator using manual controller 160, to name but a few examples.

Measurements taken by the CMM 100 may be stored in a memory module 156, which includes a non-transient memory. The memory module 156 is also configured to store, for example, a specification for a workpiece 180 to be measured; a specification for a calibration artifact; an error map; and non-transient instructions executable on the computer processor 157, to name but a few examples. Such instructions may include, among other things, instructions for controlling the moveable features of the CMM 100 for measuring a workpiece 180 and/or a calibration artifact; instructions for analyzing measurement data; and instructions for correcting measurement data (e.g., with an error map).

The measurement analyzer 154 is configured to process measurement data received from one or more sensors, such as measuring sensor 140. In some embodiments, the measurement analyzer 154 may revise the measurement data, for example by modifying the measurement data using an error map, and/or compare the measurement data to a specification, for example to assess deviation between a workpiece 180 and a specification for that workpiece 180. To that end, the measurement analyzer 154 may be a programmed digital signal processor integrated circuit, as known in the art.

Alternately, or in addition, some embodiments couple the CMM 100 with an external computer (or "host computer") 170. In a manner similar to the control system 150, the host computer 170 has a computer processor such as those described above, and non-transient computer memory 174, in communication with the processor of the CMM 100. The memory 174 is configured to hold non-transient computer instructions capable of being executed by the processor, and/or to store non-transient data, such as data acquired as a result of the measurements of an object 180 on the base 110.

Among other things, the host computer 170 may be a desktop computer, a tower computer, or a laptop computer, such as those available from Dell Inc., or even a tablet computer, such as the iPad™ available from Apple Inc. In addition to the computer memory 174, the host computer 170 may include a memory interface 175, such as a USB port or slot for a memory card configured to couple with a non-transient computer readable medium and enable transfer of computer code or data, etc. between the computer 170 and the computer readable medium.

The communication link 176 between the CMM 100 and the host computer 170 may be a hardwired connection, such as an Ethernet cable, or a wireless link, such as a Bluetooth link or a Wi-Fi link. The host computer 170 may, for example, include software to control the CMM 100 during use or calibration, and/or may include software configured to process data acquired during operation of the CMM 100. In addition, the host computer 170 may include a user interface configured to allow a user to manually operate the CMM 100. In some embodiments, the CMM and/or the host computer 170 may be coupled to one or more other computers, such as server 179, via a network 178. The network 178 may be a local area network, or the Internet, to name but two examples.

Because their relative positions are determined by the action of the movable features of the CMM 100, the CMM 100 may be considered as having knowledge of the relative locations of the base 110, and the workpiece 180. More particularly, the computer processor 157 and/or computer 170 control and store information about the motions of the movable features. Alternately, or in addition, the movable features of some embodiments include sensors that sense the locations of the table 111 and/or measuring sensor 140, and report that data to the computer 170 or controller 150. The information about the motion and positions of the table and/or measuring sensor 140 of the CMM 100 may be recorded in terms of a one-dimensional (e.g., Q, R, S), two-dimensional (e.g., Q-R; Q-S; R-S) or three-dimensional (Q-R-S) coordinate system referenced to a point on the CMM 100.

Manual User Interface

Some CMMs also include a manual user interface 160. As shown in FIG. 1E, the manual user interface 160 may have controls (e.g., buttons; knobs, etc.) that allow a user to manually operate the CMM 100. Among other things, the interface 160 may include controls that enable the user to change the position of the measuring sensor 140 relative to the workpiece 180. For example, a user can move the measuring sensor 140 in the X-axis using controls 161, in the Y-axis using controls 162, and/or in the Z-axis using controls 163.

If the measuring sensor 140 is a vision sensor, or if the CMM 141 includes a camera 141, then the user can manually move the sensor 140, camera 141, or change field of view of the vision sensor and/or camera using controls 165. The user may also focus the vision sensor and/or camera 141 using control 166 (which may be a turnable knob in some embodiments) and capture and image, or control recording of video, using control 167.

As such, the movable features may respond to manual control, or be under control of the computer processor 157, to move the base 110 and/or the measuring sensor 140 relative to one another. Accordingly, this arrangement permits the object being measured to be presented to the measuring sensor 140 from a variety of angles, and in a variety of positions.

Embodiments of a CMM 100 include a mobile controller which may be referred-to as a jogbox (or "pendant") 190. The jogbox 190 includes a number of features that facilitate an operator's control of the coordinate measuring machine 100.

The jogbox 190 is not affixed to the coordinate measuring machine 100 in that its location is movable relative to the coordinate measuring machine 100. The mobility of the jogbox 190 allows an operator of the coordinate measuring machine 100 to move relative to the coordinate measuring machine 100, and relative to a workpiece 180 on which the coordinate measuring machine 100 operates. Such mobility may allow the operator to move away from the coordinate measuring machine 100 for safety reasons, or to get a broader view of the coordinate measuring machine 100 or the workpiece 180. The mobility of the jogbox 190 also allows the operator to move closer to the coordinate measuring machine 100 and the workpiece 180 on which it operates than would be possible using a fixed control console or computer 170, in order, for example, to examine or adjust the location or orientation of the workpiece 180, or the operation of the coordinate measuring machine 100.

To that end, the jogbox 190 is in data communication with the control system 150, and may be movably coupled to the control system 150 by a tether 191. In some embodiments, the jogbox 190 is in data communication with the communications interface 152 of the control system 150 via a tether 191 (which may be an Ethernet cable, a USB cable, or a Firewire cable, to name but a few examples), as schematically illustrated in FIG. 1B, and in other embodiments the jogbox 190 is in data communication with the communications interface 152 of the control system 150 via a wireless communications link, such as a Bluetooth connection, etc.

Storage Apparatus 200

One or more workpieces 180 are stored in storage apparatus (or system) 200. In this embodiment, the storage system 200 includes one or more drawers (or shelves) 201.

As schematically illustrated in FIG. 1A, each drawer or shelf 211 of a storage system 200 may have one or more storage plates 203 configured and disposed to hold the one or more workpieces 180. A storage plate 203 may have a plate surface 202.

In some embodiments, a storage plate 203 has a metal surface 202 such that a magnet would be attracted to the surface 202 of the storage plate 203. In other embodiments, the storage plate 203 has a non-metal and non-magnetic surface, which surface neither attracts nor repels a magnet.

Robot 300

Figure 3A:
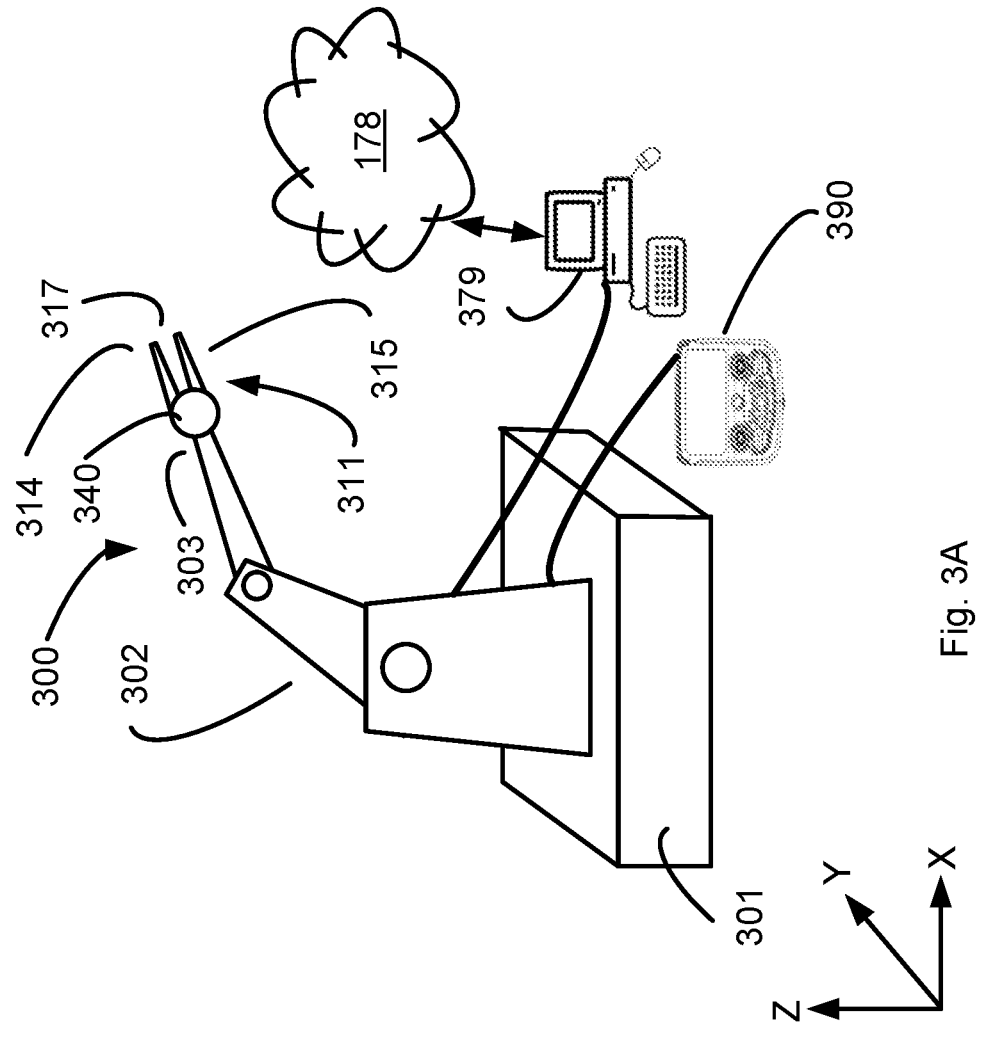
FIG. 3A schematically illustrates an embodiment of a workpiece placement robot.

A robot 300 is schematically illustrated in in FIG. 1A and FIG. 3A, and defines a robot coordinate system having three mutually orthogonal axes (X, Y and Z in FIG. 1A).

In illustrative embodiments, robot 300 is disposed so that it can reach the drawer or shelf 201 of a storage apparatus 200, and each workpiece 180 of a set of workpieces disposed at the storage apparatus 200, as well as the table 111 of the coordinate measuring machine 100, and a set of workpieces on the storage apparatus 200 and coordinate measuring machine 100. When disposed in that manner, the robot 300 can transport a workpiece 180 from the drawer or shelf 201 to the measuring space 113 of the coordinate measuring machine 100, and can transport a workpiece 180 from the measuring space 113 of the coordinate measuring machine 100 to the drawer or shelf 201. To that end, the robot 300 in this embodiment has a gripper 311 at the end 303 of a movable, articulated arm 302.

In some embodiments, the gripper 311 has two or more fingers 314, 315 separated by a gap 317. The gripper 311 is configured to controllably close and open the fingers 314, 315 to decrease or increase the gap 317 (respectively) so as to grasp and release (respectively) a workpiece 180.

In illustrative embodiments, the robot 300 (e.g., motion of the robot arm 302 and/or motion of the gripper 311) is controlled by a robot controller. For example, in some embodiments, the robot 300 is controlled by robot control computer 379, or a robot control interface 390. In alternate embodiments, the robot 300 is controlled by the motion controller 153 or the host computer 170 of the coordinate measuring machine 100, which are separate and distinct from the robot control computer 379 and the robot control interface 390.

In illustrative embodiments, the robot arm 302 includes sensors configured to measure the location of the end 303 of the arm 302 relative to the base 301 of the robot 300, each location defined by a corresponding robot arm position datum.

The robot 300 also includes, in addition to or in place of a gripper 311, a hitch 350 configured to removably couple to a coupling block 431. In some embodiments, the hitch 350 is a gripper 311 as schematically illustrated in FIG. 3A, and described above, which is configured to removably couple to a coupling block 431 by grasping the coupling block between fingers 314 and 315.

Figures 3B, 3C:
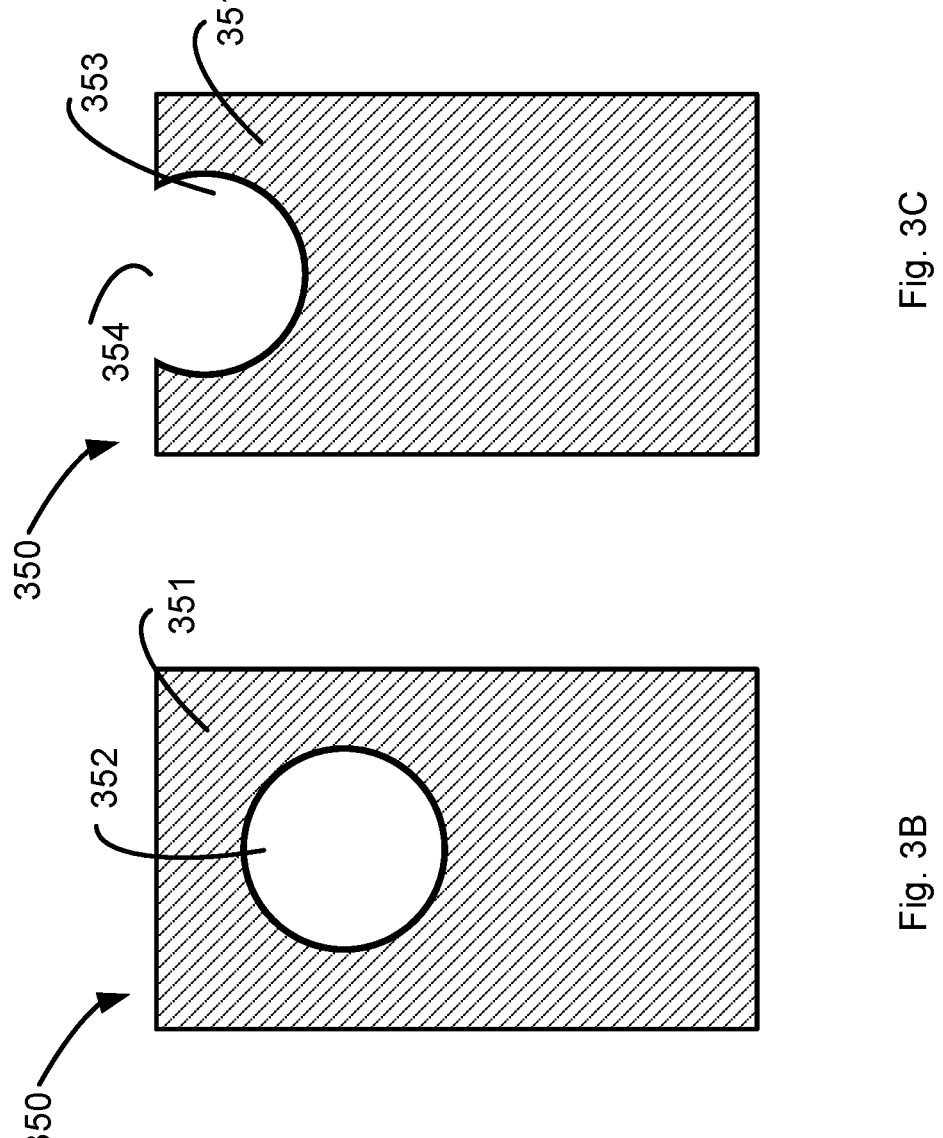
FIG. 3B schematically illustrates an embodiment of a hitch.
FIG. 3C schematically illustrates another embodiment of a hitch.

FIG. 3B schematically illustrates another embodiment of a hitch 350. In this embodiment, the hitch 350 has a beam 351 having an aperture 352. In some embodiments, the aperture 352 has a size (e.g., diameter) sufficient to fit over a corresponding coupling block 431 such that the coupling block 431 may pass entirely through the aperture 352 when the hitch removably mates with the coupling block. In other embodiments, the aperture 352 has a size (e.g., diameter) sufficient to slip partially over a corresponding coupling block 431, but not so large that the coupling block 431 may pass entirely through the aperture 352 when the hitch removably mates with the coupling block.

FIG. 3C schematically illustrates another embodiment of a hitch 350. In this embodiment, the hitch 350 has a beam 351 having a cavity 353, such as a C-shaped cavity. In some embodiments, the cavity 353 has an opening of a size sufficient to fit over a corresponding coupling block 431 when the hitch removably mates with the coupling block. In some embodiments, the cavity 353 has an opening 354 facing away from the beam 351.

In some embodiments, the opening 354 has a width not large enough for a coupling block 431 to pass through when cavity 353 engages the coupling block 431. In some embodiments, the opening 354 has a width not large enough for a standoff 432 to pass through when cavity 353 engages the coupling block 531.

Figures 4A, 4B:
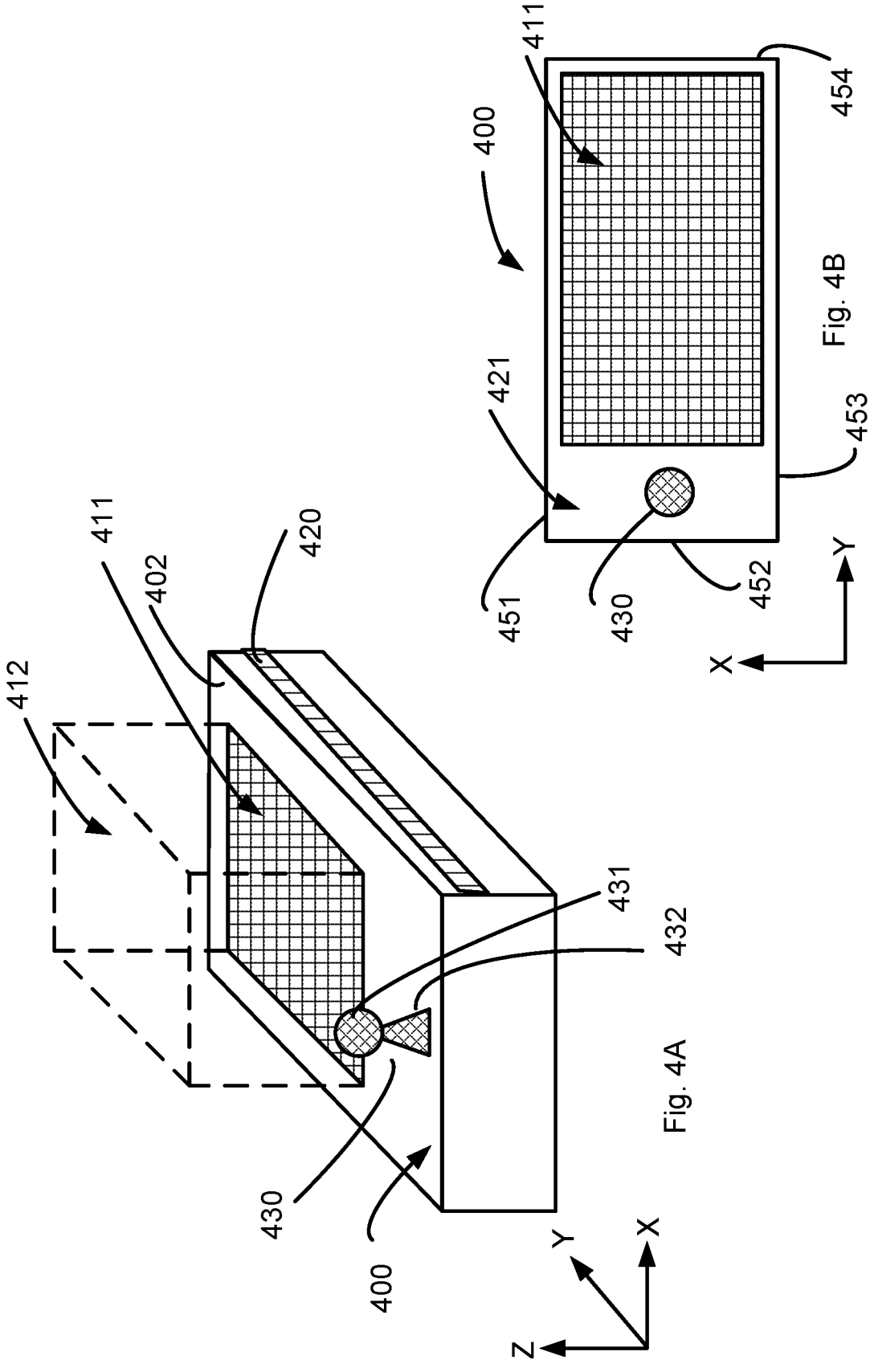
FIG. 4A and FIG. 4B schematically illustrate an embodiment of a container apparatus 400.
Figures 4C, 4D:
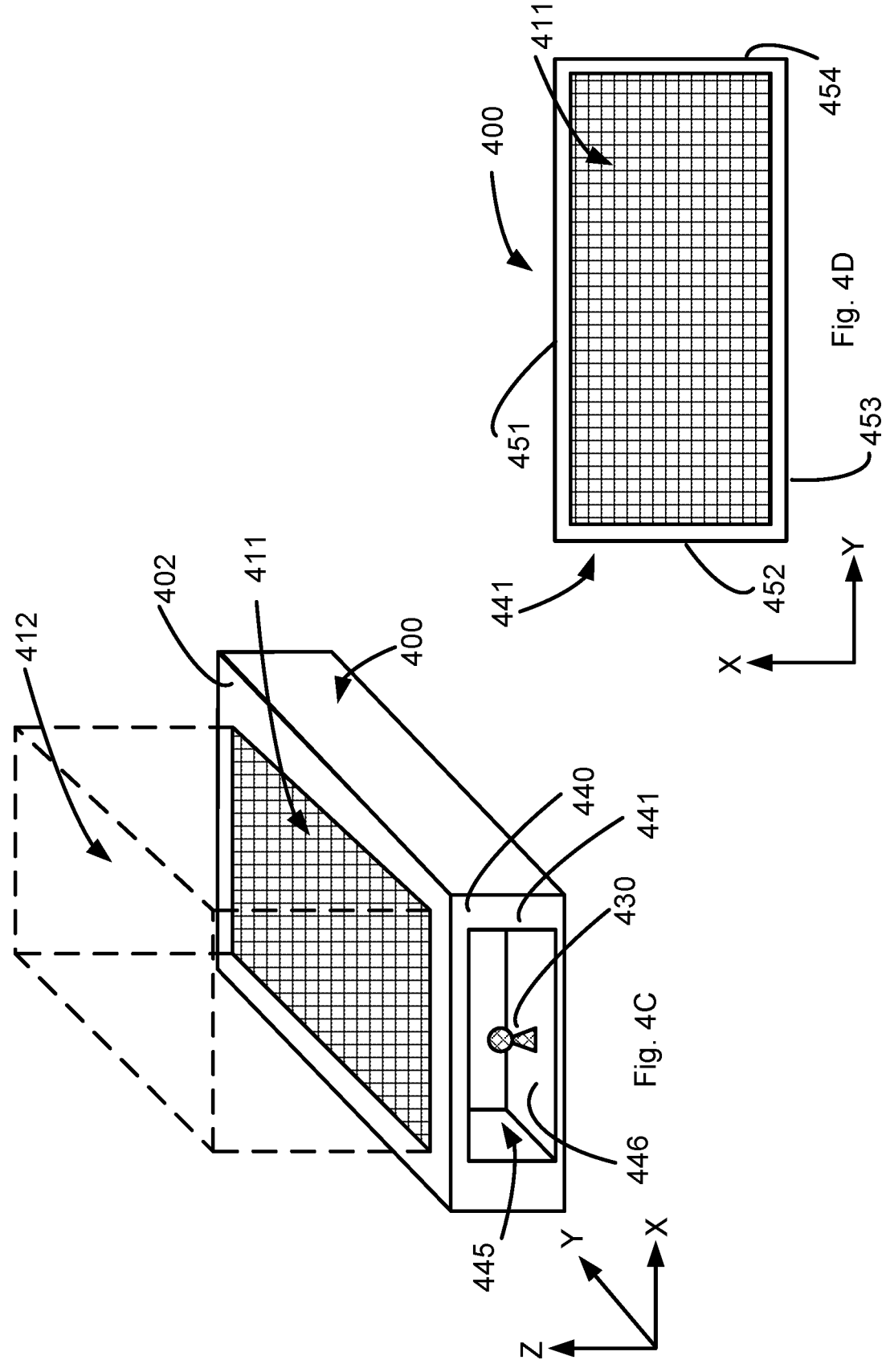
FIG. 4C and FIG. 4D schematically illustrate another embodiment of a container apparatus.

FIG. 4A and FIG. 4B schematically illustrate an embodiment of an improved container apparatus 400 for holding workpieces to be inspected. FIG. 4C and FIG. 4D schematically illustrate another embodiment of an improved container apparatus 400 for holding workpieces.

Each embodiment of container apparatus 400 in FIG. 4A and FIG. 4B, and in FIG. 4C and FIG. 4D, has a container surface 402 and a workpiece storage area 411. In FIG. 4A and FIG. 4B, the container apparatus 400 has a container surface 402 and a workpiece storage volume 412 defined from (e.g., above) the workpiece storage area 411. In the embodiment of container apparatus 400 in FIG. 4A and FIG. 4B, and in FIG. 4C and FIG. 4D, the workpiece storage area 411 may be on or at a surface 402 of the container apparatus 400, or may be recessed into the container apparatus 400, for example in a cavity extending from the surface 402 of the container apparatus 400.

In the embodiment of FIG. 4A and FIG. 4B, the container apparatus 400 has a portion 421 of its surface 402 that is disposed outside of the workpiece storage area 411 (and the workpiece storage volume 412).

In the embodiment of FIG. 4C and FIG. 4D, the container apparatus 400 defines a volume, and has a cavity 445 extending into the container apparatus 400 (e.g., into a volume defined by the external surfaces of container apparatus 400) from an outer surface 441 (which may a surface of a front panel 440). For example, some embodiments include a front panel 440 having a three-dimensional panel volume and an external surface 441 facing way from the workpiece storage volume 412, and a cavity 445 opening through the external surface 441 of the front panel 440 from space external to the workpiece storage volume 412 and extending into the three-dimensional panel volume.

The cavity has a non-zero volume, and a cavity surface 446. As schematically illustrated in FIG. 4D, the cavity 445 (e.g., the cavity surface 446) is not visible from a point of view at a position above the surface 402.

Illustrative embodiments of a container apparatus 400 include a block assembly 430, configured to physically interface with a robot end effector.

Illustrative embodiments of the block assembly 430 include a coupling block 431, suspended relative to a surface (e.g., surface 402; 412; surface 446) by a coupling block support (or "standoff") 432.

In illustrative embodiments, the coupling block 431 is configured to removably mate with a corresponding hitch 350 from the environment external to the workpiece storage volume. To that end, in some embodiments, the coupling block 431 has a shape of a semi-sphere; and in some embodiments the coupling block 431 has a shape of a hemisphere; and in some embodiments, the coupling block 431 has the shape of a frustum of a cone, and in some embodiments the coupling block 431 has a shape of a cube, to name but a few examples. The inventors have discovered that use of a robot to manipulate a drawer requires a robot with high positional accuracy. The inventors have also discovered, however, that use of a coupling block as described herein allows use of a robot with less positional accuracy that would be required for use of the robot in, for example, grasping a handle. Moreover, use of a coupling block as described here allows a coupling block (e.g., a coupling ball) and robot end effector to more reliably couple to one another. For example, if container assembly 400 is slightly out of position relative to robot 300, a coupling block 431 allows robot's end effector to engage the coupling block by slipping onto or over the coupling block 431 as the surface of the end effector engage a surface of the coupling block 431. Moreover, when a robot 300 pulls on a coupling block, and particularly when the coupling block 431 is a ball or sphere, the force is aligned in the direction of pull. In contrast, if a robot pulls on an angle relative to a normal handle, the robot exerts lateral force on the handle, and that undesirably adds mechanical noise to the operation of the system.

Some embodiments of the block assembly 430 include a flexible shock absorber operably coupled between the coupling block and a surface of the container assembly, the shock absorber configured to reduce physical shock from impact of the corresponding hitch with the block assembly, and also to isolate the container assembly from vibration arising from the hitch container assembly movement. In such embodiments, the coupling block support (or "standoff") 432 may be or include the shock absorber. In some such embodiments, the flexible shock absorber includes a pliable solid material, and in some such embodiments, the pliable solid material includes pliable rubber. In some such embodiments, the flexible shock absorber includes comprises pliable silicon or a polyurethane.

In the embodiment of FIG. 4A and FIG. 4B, the block assembly 430 is disposed on and rigidly fixed to an outer surface of the container apparatus 400. More specifically, in the embodiment of FIG. 4A and FIG. 4B, the block assembly 430 is disposed on the portion 421 of the surface that is external to the workpiece storage area 411. In this way, the block assembly does not take up space on the surface of the workpiece storage area 411, and does not occupy any portion of the workpiece storage volume 412.

In the embodiment of FIG. 4C and FIG. 4D, the block assembly 430 is disposed on and rigidly fixed to an inner surface 446 of the cavity 445. In illustrative embodiments, the block assembly 430 is disposed completely within the volume of the cavity 445, and the block assembly 430 remains completely within the volume of the cavity 445 even when the block assembly 430 is removably coupled to an end effector of a robot 300, including without limitation when the robot 300 is pulling or pushing on the block assembly 430 to move the container apparatus 400.

In illustrative embodiments (including, e.g., the embodiments of FIG. 4A and FIG. 4B, as well as the embodiments of FIG. 4C and FIG. 4D) the block assembly 430 rigidly affixed to the container assembly and exposed to an environment external to the workpiece storage volume 412.

In illustrative embodiments (including, e.g., the embodiments of FIG. 4A and FIG. 4B, as well as the embodiments of FIG. 4C and FIG. 4D) the block assembly 430 is disposed such that a hitch (e.g., robot end effector) can move to and removably couple with the block assembly without the hitch having to enter or pass through the workpiece storage volume 412.

Figures 2A, 2B:
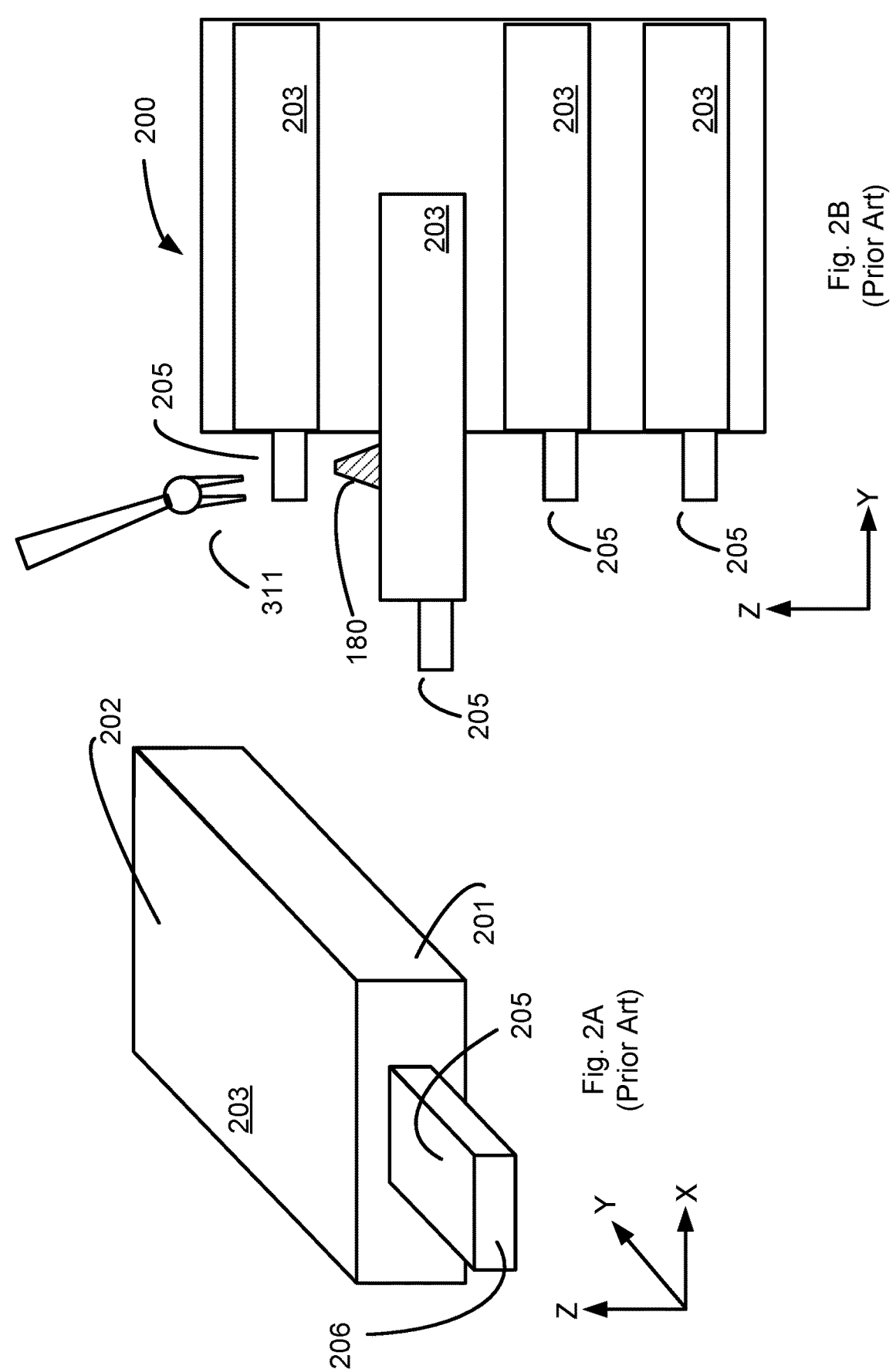
FIG. 2A schematically illustrates an embodiment of a prior art storage plate for storing workpiece holding workpieces.
FIG. 2B schematically illustrates an embodiment of a prior art storage apparatus.

In illustrative embodiments, the container apparatus 400 has an outer perimeter, for example defined by the outer edges of the apparatus 400, and the block assembly 430 does not define any part of that outer perimeter. In other words, the block assembly 430 is disposed completely within the outer perimeter of the container apparatus 400. This is unlike a traditional drawer or movable shelf 201 as schematically illustrated in FIG. 2A and FIG. 2B, which has a tongue 205 (which may be a handle), wherein the outer edge or surface 206 of the tongue 205 defines one extremity of the outline or perimeter of the drawer or shelf 201. FIG. 2B schematically illustrates a scenario in which a tongue 205 that impedes the ability of robot gripper 311 to access workpiece 180.

For example, in the illustrative embodiments of FIG. 4B and FIG. 4D, the outer dimensions 451, 452, 453, 454 of the container apparatus 400 define a footprint of the container apparatus, and the block assembly does not extend from the cavity such that it exceeds the footprint of the container apparatus.

Figure 5:
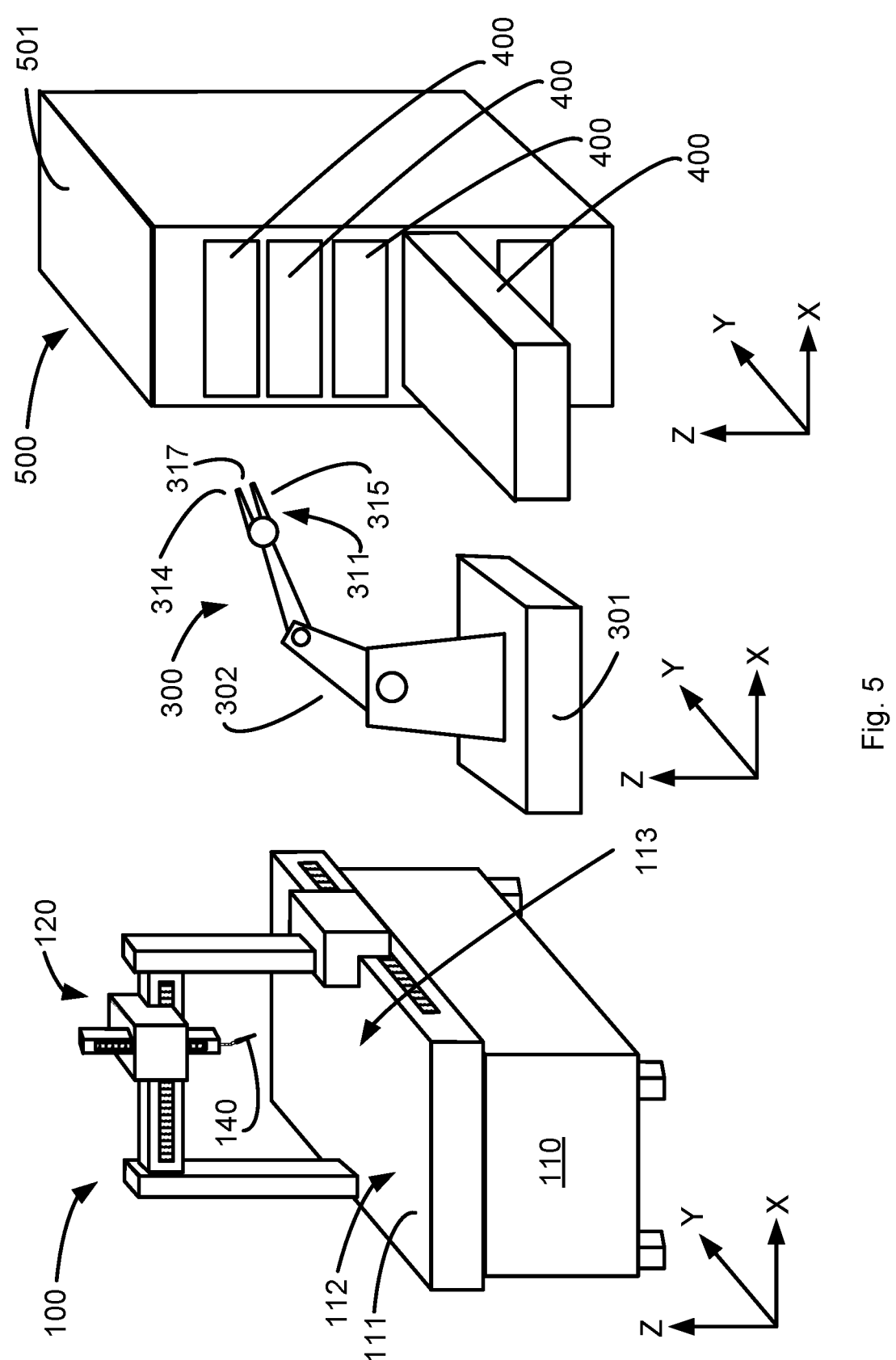
FIG. 5 schematically illustrates an embodiment of a storage apparatus.

Some embodiments of container apparatus 400 are configured to movably couple to (or mate with) a storage apparatus, such as an apparatus 500 schematically illustrated in FIG. 5. Such a container apparatus 400 may be referred-to as a "drawer." To that end, the embodiment of embodiments of container apparatus 400 of FIG. 4A includes a storage apparatus interface assembly 420 secured to the container apparatus 400, and to movably couple to a storage apparatus 500. The storage apparatus interface assembly 420 may be as simple as a member, such as a wooden member or a metal member, configured to slide along a corresponding member on or in the storage apparatus 500, or may be a ball bearing drawer slide as known in the cabinet arts. The storage apparatus interface assembly 420 is distinct from the block assembly 430.

Figures 4E, 4F, 4G:
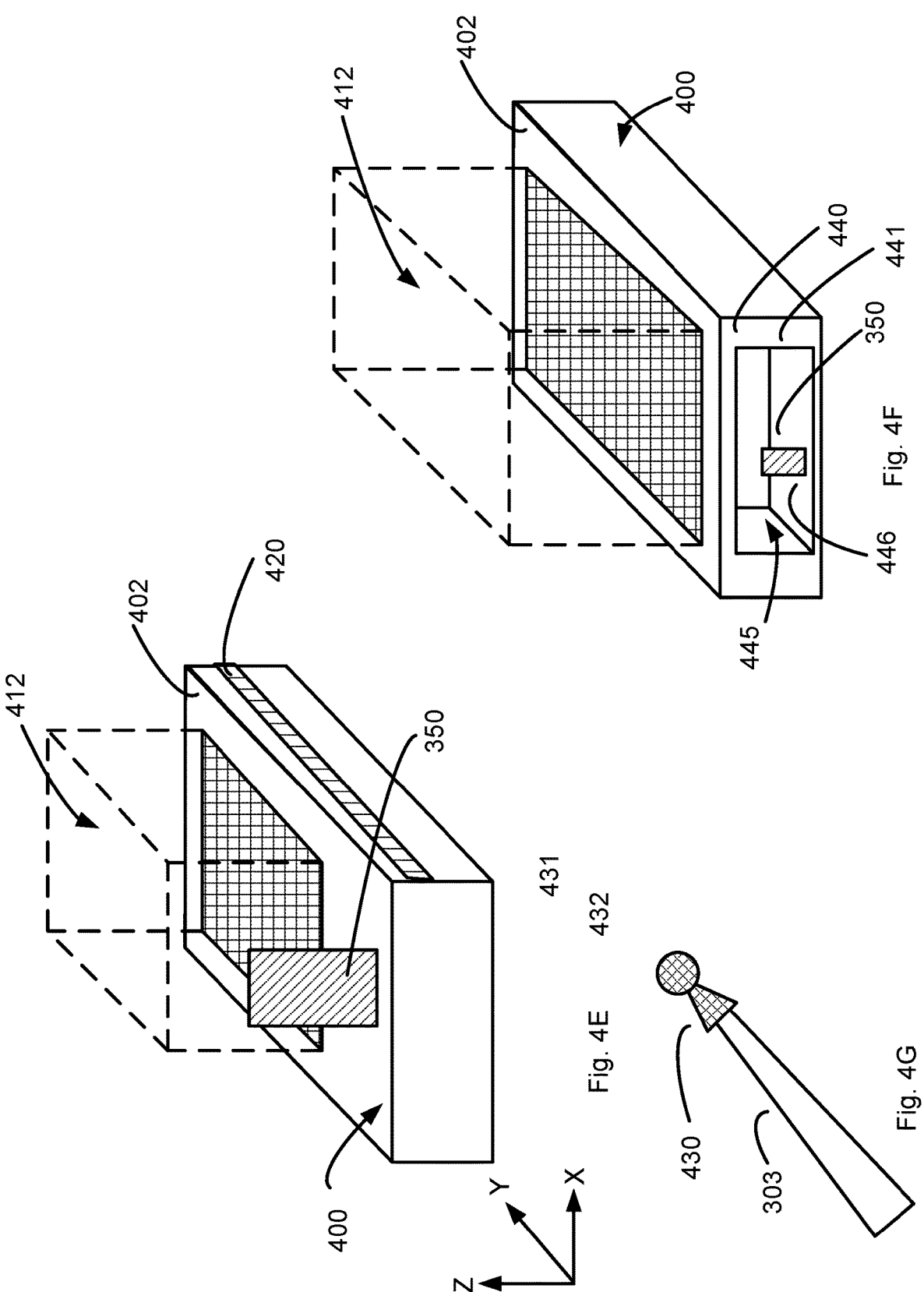
FIG. 4E schematically illustrates another embodiment of a container apparatus.
FIG. 4F schematically illustrates another embodiment of a container apparatus.
FIG. 4G schematically illustrates another embodiment of a robotic arm.

FIG. 4E schematically illustrates another embodiment of a container apparatus 400, and FIG. 4F schematically illustrates another embodiment of a container apparatus 400. In the embodiments of FIG. 4E and FIG. 4F, the container apparatus 400 includes a hitch 350. In such embodiments, the hitch 350 on the container apparatus 400 is configured to removably couple with a block assembly 430, such a block assembly 430 mounted on a robotic arm 300. FIG. 4G schematically illustrates an embodiment of a robotic arm with a mounted block assembly 430.

FIG. 5 schematically illustrates an embodiment of a storage apparatus 500 having a rigid frame 501 and plurality of container apparatuses 400. In an illustrative embodiment, such a storage apparatus 500 has a single container apparatus 400, and in another embodiment, a storage apparatus 500 includes a plurality of container apparatuses 400.

In an illustrative embodiment, the rigid frame 501 may be a chest, such that when one or more container apparatuses 400 are movably coupled to the rigid frame 501 the rigid frame 501 and container apparatuses 400 may be described as a chest of drawer(s). In another embodiment, the rigid frame 501 may be a shelving unit, such that when one or more container apparatuses 400 are movably coupled to the rigid frame 501 the rigid frame 501 and container apparatuses 400 may be described as a set of shelves.

Figure 6:
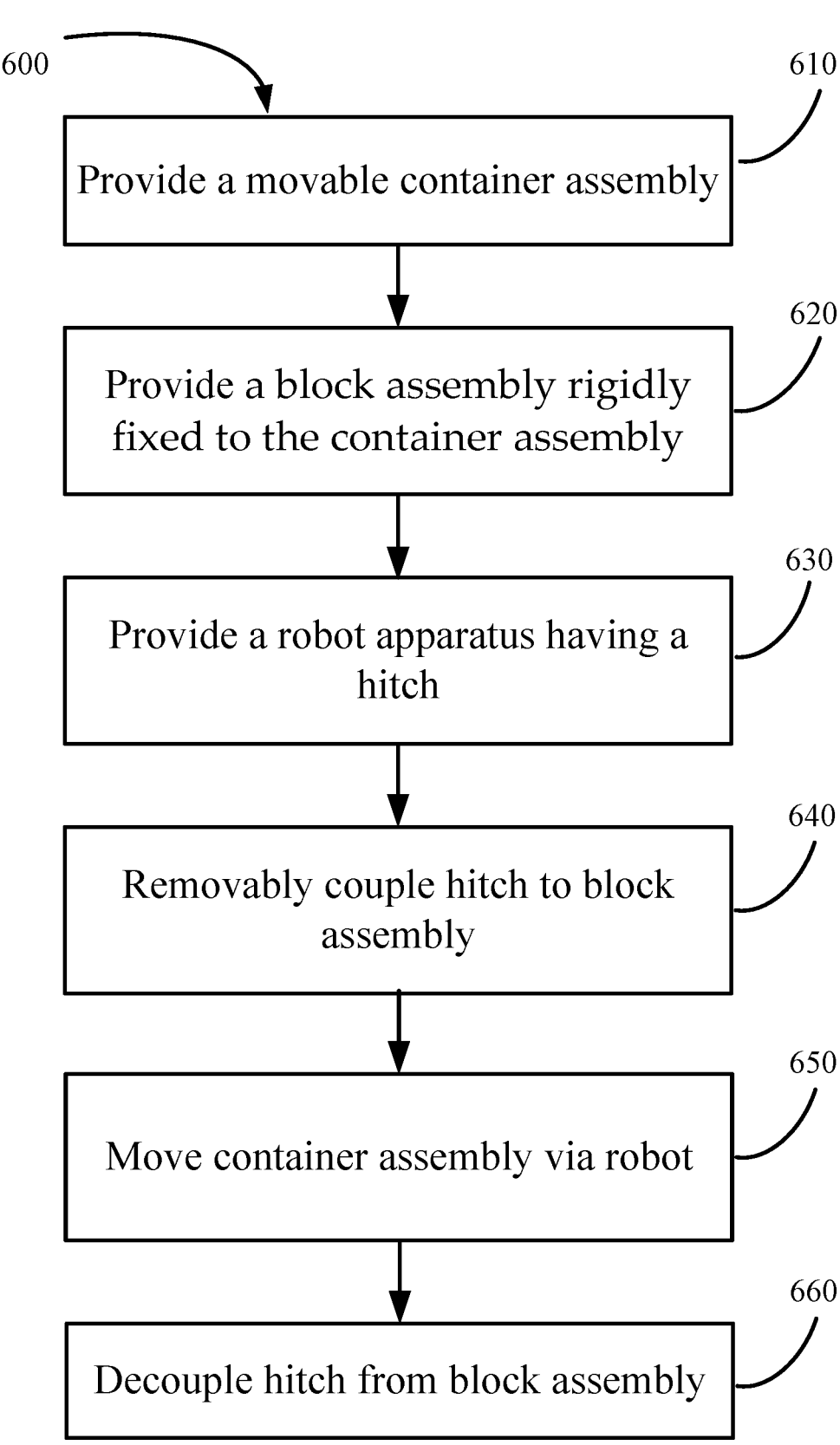
FIG. 6 is a flow chart that illustrates an embodiment of a method of using a container apparatus.

FIG. 6 is a flow chart illustrating an embodiment of a method 600 of using a container apparatus 400.

Step 610 includes providing a movable container assembly 400, the container assembly 400 defining a workpiece storage volume. The container assembly 400 may be any embodiment of container assembly described herein.

In some embodiments, the container assembly 400 has a container assembly interface configured to movably mate the container apparatus to a storage apparatus.

Step 620 includes providing a block assembly 430 rigidly fixed to the container assembly and exposed to an environment external to the workpiece storage volume. In illustrative embodiments, the block assembly 430 includes a coupling block configured to removably mate with a corresponding hitch from the environment external to the workpiece storage volume. In some embodiments, in which a container assembly provided at step 610 already includes a block assembly 430 rigidly fixed to the container assembly 400, step 610 and step 620 may be consolidated.

Step 630 includes providing a robot apparatus 300 having a hitch 350 configured to removably couple to the block assembly 430.

Step 640 includes removably coupling the hitch 350 to the block assembly 430. In illustrative embodiments, removably coupling the hitch 350 to the block assembly 430 includes automatically (or robotically) moving the robot apparatus 300 to removably couple the hitch 350 to the block assembly 430. In some embodiments, the hitch 350 couples to the block assembly 430 by passing an aperture 352 over the coupling block 431, such that the coupling block 321 passes completely through the aperture 352. In some embodiments, the hitch 350 couples to the block assembly 430 by passing an aperture 352 partially over the coupling block 431, such that a surface of the aperture 352 physically engages the coupling block 431 and the coupling block 431 does not pass completely through the aperture 352. In some embodiments, the hitch 350 couples to the block assembly 430 by passing a cavity 353 partially over the coupling block 431, such that a surface of the cavity 353 physically engages the coupling block 431 and the coupling block 431 does not pass completely through the cavity 353.

Step 650 includes moving the container assembly 400 via the hitch 350 and robot apparatus 300. For example, in illustrative embodiments a robot 300 moves the container assembly 400 by moving a robot arm to pull, or alternately push and pull the container assembly 400. Some embodiments, move the container assembly 400 in a direction away from the storage apparatus, to expose the workpiece storage volume 412 of the container apparatus to a robot so that the robot can pick and place one or more workpieces to and from the container assembly 400. Alternatively, or in addition, some embodiments move the container assembly 400 in a direction toward or into the storage apparatus. Some such embodiments, in which the container assembly 400 may described as a drawer, moving the container assembly 400 may include moving the container assembly 400 to open the drawer and/or to close the drawer. In other wors, in some embodiments, the robot 300 can move the container assembly 400 (e.g., drawer) in both directions: away from and toward the storage apparatus frame 501.

In illustrative embodiments, step 650 includes moving the container assembly 400 relative to a storage apparatus 500. In illustrative embodiments, moving the container assembly while the hitch is removably coupled to the block assembly is affected by applying a force to the block assembly 430 from the robot apparatus 300.

Step 660 includes automatically (e.g., robotically) decoupling the hitch 350 from the block assembly 430. In illustrative embodiments, decoupling the hitch 350 from the block assembly 430 includes automatically (or robotically) moving the robot apparatus 300 to decouple the hitch 350 from the block assembly 430. In illustrative embodiments, decoupling the hitch 350 from the block assembly 430 is performed without human assistance.

In embodiments in which the block assembly 430 is affixed to a robot 300 and the hitch 350 is affixed to the container assembly 400, and step 620 includes proving a hitch assembly 430 fixed to the container assembly; step 630 includes proving a robot 300 having a block assembly 430.

A listing of certain reference numbers is presented below.

100: Coordinate measuring machine;
101: Floor;
102: Environment;
110: Base;
111: Table;
112: Plane;
113: Measurement envelope;
115: Probe rack;
120: Moveable features;
121: Bridge legs;
122: Table scale;
123: Bridge;
124: Bridge scale;
125: Carriage;
126: Spindle;
127: Spindle scale;
128: Bearing;
130: Arm;
131: Moveable joint;
132: Rotary encoder;
140: Measuring sensor;
141: Camera;
142: Environmental sensor;
150: Control system;
151: Bus;
152: Communications interface;
153: Motion Controller;
154: Measurement analyzer;
155: Sensor input;
156: Memory;
157: Computer processor;
160: User interface;
161: X-axis controls;
162: Y-axis controls;
163: Z-axis controls;
165: Camera motion controls;
166: Camera focus control;
167: Camera record control;
170: Host computer;
171: Screen;
172: Keyboard;
173: Mouse;
174: Computer memory;
175: Memory interface/communications port;
176: Communication link;
178: Network;
179: Computer;
180: Workpiece;
181: Geometry;
182: Edge;
183: Corner;
184: Flat surface;
185: Curved surface;
186: Cavity;
187: Inside angle;
188: Waviness;
189: Surface finish;
190: Jogbox;
191: Jogbox cable;

200: Prior art storage apparatus;
201: Drawer or shelf;
202: Surface of storage plate;
203: Storage plate;
205: Tongue;
300: Robot;
301: Robot base;
302: Robot arm;
303: Distal end of robot arm;
311: Robot gripper;
314: First gripper finger;
315: Second gripper finger;
316: Gripper center line;
317: Gripper gap;
321: Reference geometry tool;
322: Tip of reference geometry tool;
340: Robot end effector (e.g., gripper, etc.)
345: Carousel;
350: Hitch;
351: Beam;
352: Aperture;
353: Cavity;
354: Cavity opening;
379: Robot control computer;
390: Robot control interface;
400: Container apparatus;
402: Container surface;
411: Workpiece storage area;
412: Workpiece storage volume;
421: Portion outside of workpiece storage area;
420: Storage apparatus interface assembly;
430: Block assembly;
431: Coupling block;
432: Coupling block support;
440: Front panel;
441: External surface of front panel;
442: Three-dimensional volume;
445: Cavity;
446: Cavity surface;
500: Storage apparatus;
501: Storage apparatus frame.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A container apparatus for holding workpieces to be inspected, the container apparatus configured to movably mate to a storage apparatus, the container apparatus comprising:

a storage apparatus interface assembly configured to movably mate the container apparatus to the storage apparatus;

a container assembly defining a workpiece storage volume; and a block assembly rigidly fixed to the container assembly and exposed to an environment external to the workpiece storage volume, the block assembly comprising a coupling block configured to removably mate with a corresponding hitch from the environment external to the workpiece storage volume.

P2. The container apparatus of P1, wherein the container assembly comprises a front panel:

the front panel having a three-dimensional panel volume and an external surface facing way from the workpiece storage volume, and a cavity opening through the external surface of the front panel from space external to the workpiece storage volume and extending into the three-dimensional panel volume, wherein the block assembly is rigidly fixed to the container assembly within the three-dimensional panel volume.

P3. The container apparatus of any of P1-P2, wherein the block assembly is disposed such that the hitch can move to and removably couple with the block assembly without the hitch having to enter or pass through the workpiece storage volume.

P4. The container apparatus any of P1-P3, wherein:

the container assembly defines a container volume, the workpiece storage volume being a portion of the container volume and enclosed within the container volume; and wherein the block assembly is disposed within the container volume but at least partially external to the workpiece storage volume.

P5. The container apparatus of any of P1-P4, wherein outer dimensions of the container apparatus define a footprint of the container apparatus, and the block assembly does not extend from the cavity such that it exceeds the footprint of the container apparatus.

P6. The container apparatus any of P1-P5, wherein the block assembly further comprises a flexible shock absorber operably coupled between the coupling block and a surface of the container assembly, the shock absorber configured to reduce physical shock from impact of the corresponding hitch with the block assembly, and/or to isolate the container assembly from vibration arising from the hitch during container assembly movement.

P7. The container apparatus of P6, wherein the flexible shock absorber comprises a pliable solid material.

P8. The container apparatus of P6, wherein the pliable solid material comprises pliable rubber.

P9. The container apparatus of P6, wherein the pliable solid material comprises pliable silicon.

P10. The container apparatus of any of P1-P9, wherein the coupling block comprises a semi-sphere.

P11. The container apparatus of any of P1-P10, wherein the coupling block comprises a hemisphere.

P12. The container apparatus of any of P1-P11, wherein the coupling block comprises a frustum of a cone.

P13. The container apparatus of any of P1-P12, wherein the corresponding hitch comprises a beam having an aperture, the aperture having a size sufficient to fit over the coupling block when the hitch removably mates with the coupling block.

P14. The container apparatus of any of P1-P13, wherein the corresponding hitch comprises a beam having an aperture, the aperture having a size sufficient to allow the coupling block to pass completely through the aperture.

P15. The container apparatus of any of P1-P14, wherein the corresponding hitch comprises a beam having a C-shaped cavity, the cavity defining an opening having a size sufficient to fit over the coupling block to removably mate the hitch removably to the coupling block.

P16. The container apparatus of any of P1-P15, wherein the corresponding hitch comprises a gripper having a controllable gripper width configured to controllably grasp the coupling block.

P17. The container apparatus of any of P1-P16, wherein the entire container assembly defines a volume and outer perimeter, wherein the volume of the container assembly fits completely within the outer perimeter, and wherein the block assembly does not define any portion of the outer perimeter.

P18. The container apparatus of any of P1-P17, wherein the entire container assembly defines a volume and the block assembly fits completely within the volume.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A container apparatus for holding workpieces to be inspected, the container apparatus configured to movably mate to a storage apparatus, the container apparatus comprising:

a storage apparatus interface assembly configured to movably mate the container apparatus to the storage apparatus;

a container assembly defining a workpiece storage volume, the container assembly comprising a front panel having a three-dimensional panel volume and an external surface facing away from the workpiece storage volume, and a cavity opening through the external surface of the front panel from space external to the workpiece storage volume and extending into the three-dimensional panel volume; and a block assembly rigidly fixed to the container assembly and exposed to an environment external to the workpiece storage volume, the block assembly comprising a coupling block configured to removably mate with a corresponding hitch from the environment external to the workpiece storage volume, wherein the block assembly is rigidly fixed to the container assembly within the three-dimensional panel volume.

2. The container apparatus of claim 1, wherein the block assembly is disposed such that the hitch can move to and removably couple with the block assembly without the hitch having to enter or pass through the workpiece storage volume.

3. The container apparatus of claim 1, wherein:

the container assembly defines a container volume, the workpiece storage volume being a portion of the container volume and enclosed within the container volume; and wherein the block assembly is disposed within the container volume but at least partially external to the workpiece storage volume.

4. The container apparatus of claim 1, wherein outer dimensions of the container assembly define a footprint of the container assembly, and the block assembly does not extend from the cavity such that it exceeds the footprint of the container assembly.

5. The container apparatus of claim 1, wherein the block assembly further comprises a flexible shock absorber operably coupled between the coupling block and a surface of the container assembly, the shock absorber configured to reduce physical shock from impact of the corresponding hitch with the block assembly and to isolate the container assembly from vibration arising from the hitch during container assembly movement.

6. The container apparatus of claim 1, wherein the coupling block comprises a semi-sphere.

7. The container apparatus of claim 1, wherein the coupling block comprises a hemisphere.

8. The container apparatus of claim 1, wherein the coupling block comprises a frustum of a cone.

9. The container apparatus of claim 1, wherein the corresponding hitch comprises a beam having an aperture, the aperture having a size sufficient to fit over the coupling block to removably mate the hitch to the coupling block, but said size not sufficient to allow the coupling block to pass completely through the aperture when the hitch removably mates with the coupling block.

10. The container apparatus of claim 1, wherein the corresponding hitch comprises a beam having an aperture, the aperture having a size sufficient to allow the coupling block to pass completely through the aperture to removably mate the hitch with the coupling block.

11. The container apparatus of claim 1, wherein the entire container assembly defines a volume and outer perimeter, wherein the volume of the container assembly fits completely within the outer perimeter, and wherein the block assembly does not define any portion of the outer perimeter.

12. A storage apparatus comprising:

a set of container assemblies, each container assembly of the set of container assemblies movably coupled to a frame, wherein at least one container assembly of the set of container assemblies defines a workpiece storage volume and comprises:

a front panel having a three-dimensional panel volume and an external surface facing away from the workpiece storage volume, and a cavity opening through the external surface of the front panel from space external to the workpiece storage volume and extending into the three-dimensional panel volume, and also comprises:

a storage apparatus interface assembly configured to movably mate the container assembly to the frame; and a block assembly rigidly fixed to the container assembly and exposed to an environment external to the workpiece storage volume, the block assembly comprising a coupling block configured to removably mate with a corresponding hitch from the environment external to the workpiece storage volume.

13. The storage apparatus of claim 12, wherein the corresponding hitch comprises a beam having an aperture, the aperture having a size sufficient to fit over the coupling block to removably mate the hitch to the coupling block, but said size not sufficient to allow the coupling block to pass completely through the aperture when the hitch removably mates with the coupling block.

14. The storage apparatus of claim 12, wherein the corresponding hitch comprises a beam having an aperture, the aperture having a size sufficient to allow the coupling block to pass completely through the aperture to removably mate the hitch with the coupling block.

15. A method comprising:

providing a movable container assembly, the container assembly defining a workpiece storage volume, and the container assembly comprising a container assembly interface configured to movably mate the container assembly to a storage apparatus and comprising a front panel having a three-dimensional panel volume and an external surface facing away from the workpiece storage volume, and a cavity opening through the external surface of the front panel from space external to the workpiece storage volume and extending into the three-dimensional panel volume;

providing a block assembly rigidly fixed to the container assembly and exposed to an environment external to the workpiece storage volume, the block assembly comprising a coupling block configured to removably mate with a corresponding hitch from the environment external to the workpiece storage volume, wherein the block assembly is rigidly fixed to the container assembly within the three-dimensional panel volume;

providing a robot apparatus having a hitch configured to removably couple to the block assembly; and automatically moving the robot apparatus to removably couple the hitch to the block assembly.

16. The method of claim 15, further comprising moving the container assembly while the hitch is removably coupled to the block assembly by applying a force to the block assembly from the robot apparatus.

17. The method of claim 16, wherein moving the container assembly comprises moving the container assembly in a direction away from the storage apparatus.

* * * * *